Nov. 19, 1968     D. LLOYD     3,411,344
RESONANT FREQUENCY VIBRATION TESTING METHOD AND APPARATUS
Filed Nov. 2, 1964     4 Sheets-Sheet 1
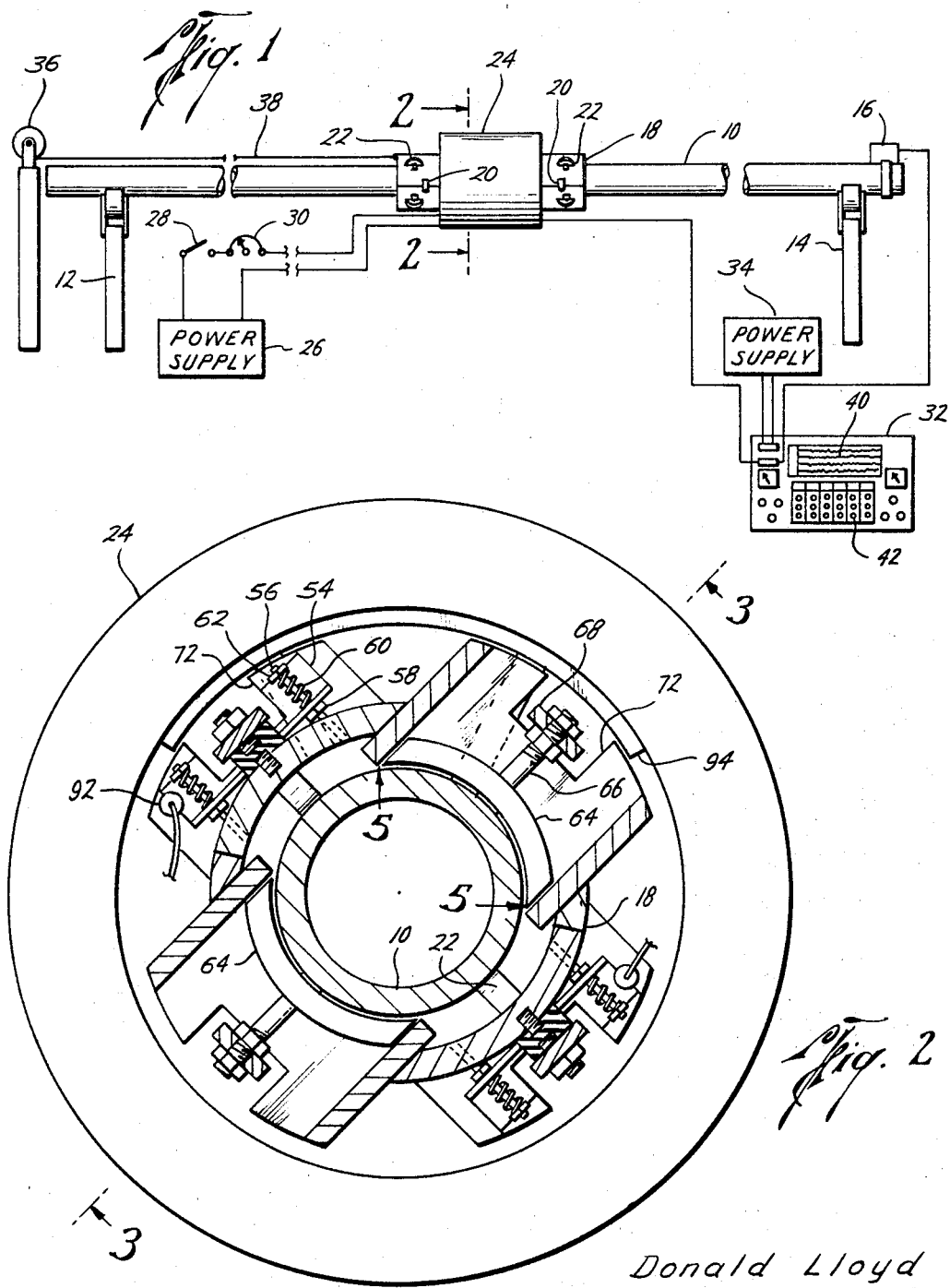
Donald Lloyd
INVENTOR.
BY *Vincent Martin*
*Joe E. Edwards*
*Jack R. Springgate*
ATTORNEYS

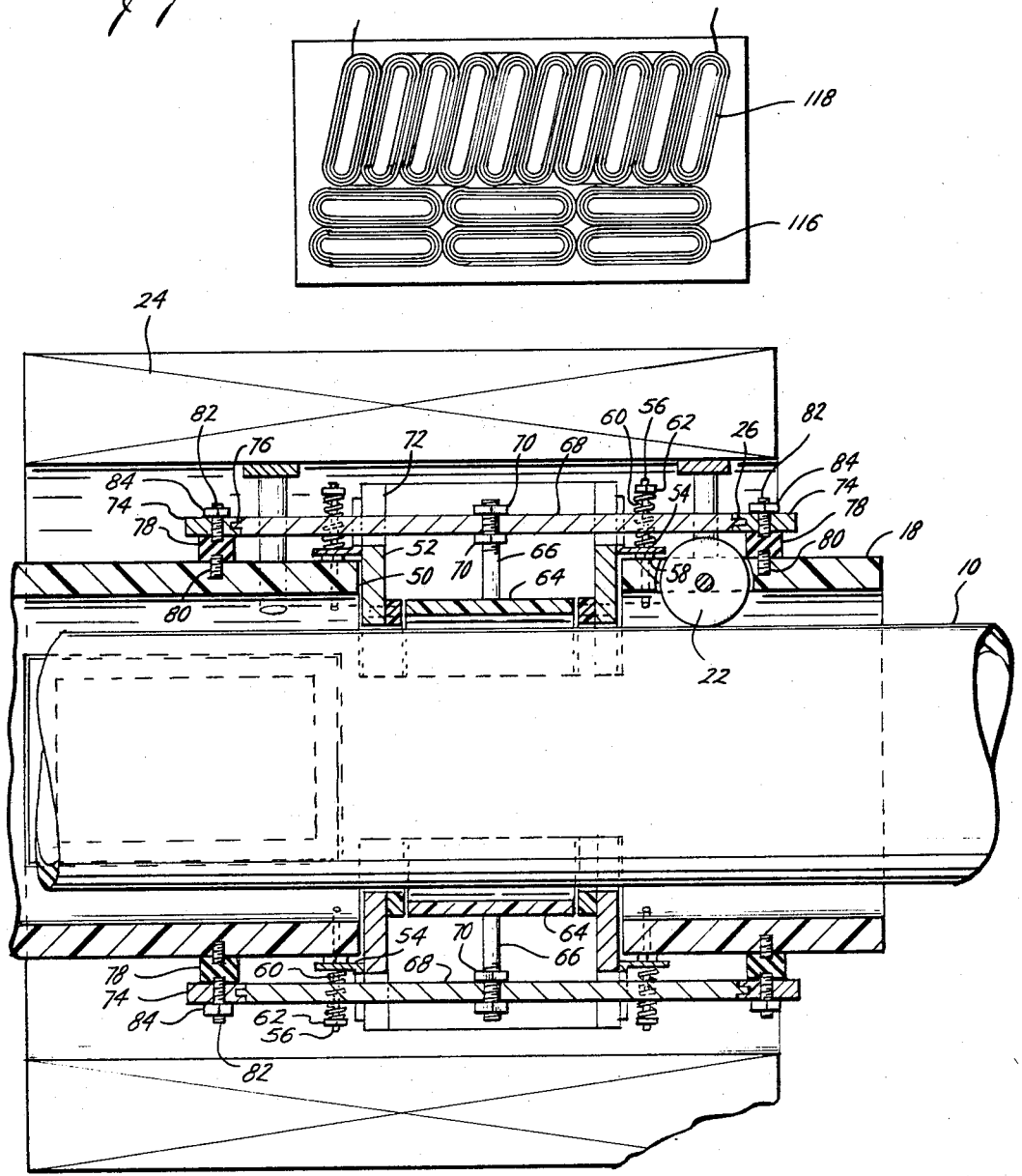

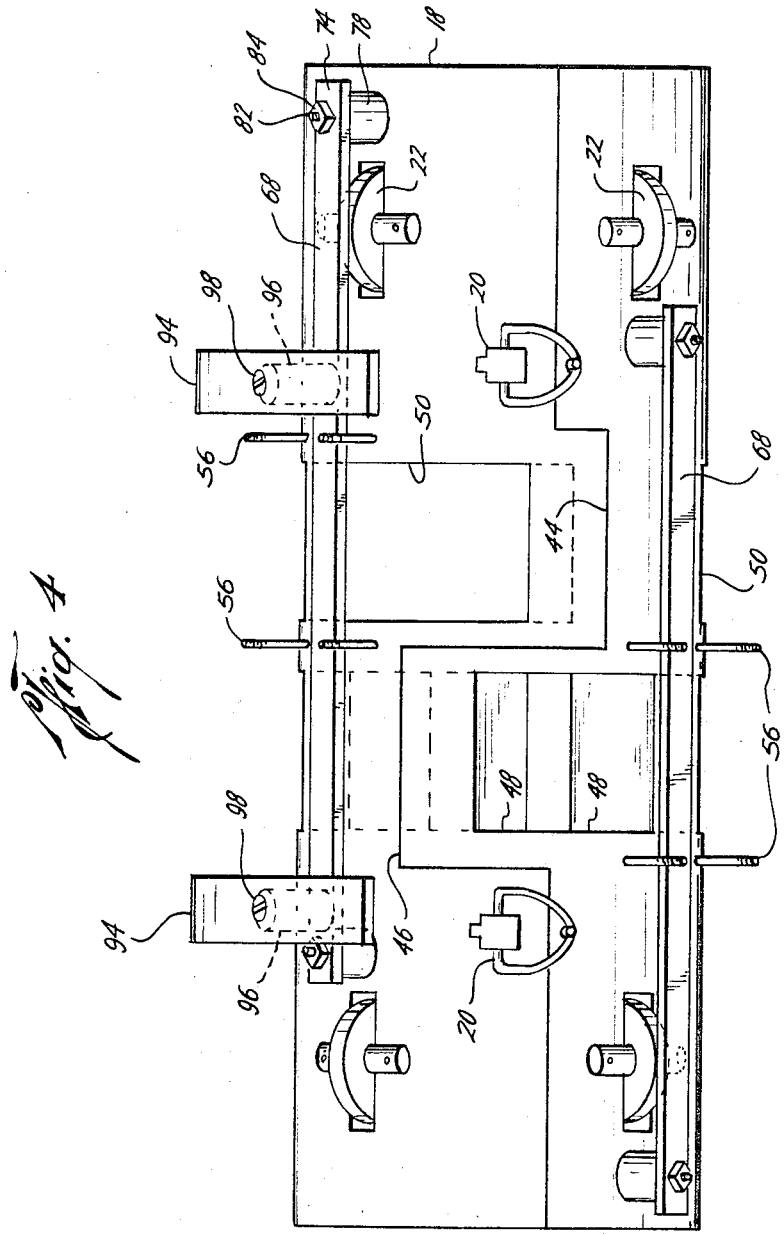

Nov. 19, 1968     D. LLOYD     3,411,344

RESONANT FREQUENCY VIBRATION TESTING METHOD AND APPARATUS

Filed Nov. 2, 1964     4 Sheets-Sheet 4

Donald Lloyd
INVENTOR.

ATTORNEYS

United States Patent Office 3,411,344
Patented Nov. 19, 1968

3,411,344
RESONANT FREQUENCY VIBRATION TESTING
METHOD AND APPARATUS
Donald Lloyd, Houston, Tex., assignor of fifty percent to
William H. Hopkins, Harlingen, Tex.
Filed Nov. 2, 1964, Ser. No. 408,226
11 Claims. (Cl. 73—67.2)

ABSTRACT OF THE DISCLOSURE

A method for detecting flaws in a member including vibrating the member at a resonant frequency, establishing a magnetic field, scanning the member with pickup coils and providing an indication of the output of the pickup coils to locate flaws in the member and the apparatus therefor.

---

The present invention relates generally to a method and an apparatus for testing a member to determine certain physical properties of the member. More particularly, the present invention relates to a testing device utilizing a combination of methods of testing for the determination of variation from accepted standards of physical condition of the member being tested. The present method and apparatus have particular application for testing tubular members, such as pipe.

Prior to the present invention, many individual methods and devices have been utilized for the detection of physical condition of a member being tested, such as inclusions, fatigue cracks, flaws, stress concentrations and wall thickness, in members, such as pipe. These devices have utilized ultrasonic vibrations, induced magnetic fields, radiation and other systems for such testing. None of these prior methods and devices has utilized more than a single method of testing for physical conditions. Each of the prior methods used has had certain advantages and disadvantages.

In devices utilizing ultrasonic vibrations, the member being tested is subjected to high-frequency vibrations and the reflections of these vibrations from flaws are recorded against time to distinguish reflections from flaws from the reflections naturally occurring in such members. Difficulty has been encountered in such ultrasonic devices in achieving a proper coupling of the vibration source and the detecting source to the member being tested. Also, considerable difficulty has been encountered in the interpretation of the records produced by such ultrasonic devices.

Equipment utilizing X-ray for the detection of flaws is standard in many manufacturing plants, is expensive and is not readily adaptable to be moved into remote locations, such as drilling sites, to test drill pipe for flaws.

Magnetic testing devices which induce a magnet field into the member being tested and detect the presence of flaws by detecting the variation of the magnetic flux in the area of a flaw have been used. Such devices are responsive to magnetic anomalies, such as stress concentrations, grain structure, hard and soft spots and, therefore, produce a test record which is difficult to interpret. Such magnetic methods, however, are extremely helpful, particularly when it is desired to ascertain such physical properties of the member being tested as stress concentrations, transverse fatigue cracks and pitting.

Induced eddy currents have been used by some prior devices for the detection of flaws. Such system is extremely desirable for the detection of surface flaws, particularly where such surface flaws are hidden by mill scale, but will not detect internal flaws.

Radiation devices have been used which direct radiation through the member being tested and count the radiation received as a determination of the mass of material between the source and the receiver. Such devices will indicate when there is less material in the member than is required, but such device will not distinguish between internal pitting of a pipe and wall thickness being less than required. Such radiation methods are generally used in spot checks and will only cover a small portion of the surface of the member being tested.

Since a very considerable amount of testing of pipe is carried on in remote locations, a simple method and device suitable for such remote location testing has been needed. Such device should be readily portable and should utilize methods of testing whereby a complete testing of a member to determine its physical condition can be made with the device. Such device should preferably embody the features of several testing methods whereby the advantages of such testing methods may be utilized.

Therefore, it is an object of the present invention to provide a method and an apparatus for testing a member to determine its physical condition, such method and apparatus embodying a novel combination of three testing methods.

Another object of the present invention is to provide a method and an apparatus for testing a member whereby the physical condition of the member may be determined by sonic, magnetic and electric hysteresis methods, by any one of such methods and by any combination of such methods.

A further object of the present invention is to provide a method and an apparatus for testing a member, such as a pipe, to determine such physical conditions of the member as reduced wall thickness, surface flaws, internal flaws, stress concentrations, pitting, mill flaws and fatigue cracks.

Another object of the present invention is to provide method and apparatus for testing a member including the combination of a novel sonic testing method and apparatus and a novel electric hysteresis testing method and apparatus.

A still further object of the present invention is to provide a portable device for testing a member to determine its physical condition.

Still another object of the present invention is to provide a method and apparatus for detecting physical condition of a member by imparting sonic vibrations to such member in a resonant frequency and detecting the intensity of such imparted vibrations at the surface of such member.

Another object of the present invention is to provide a method and an apparatus for determining physical condition of the member in which the member is vibrated at its resonant frequency and intensity of such vibrations at the surface of the member is detected by the vibration of a coil positioned in a magnetic field.

Still another object of the present invention is to provide a method and an apparatus for testing a member sonically wherein the magnetic detection of vibrations resulting from flaws in the member is supplemented by the variation of magnetic flux at such flaws.

A still further object of the present invention is to provide a method of detecting flaws in a pipe wherein the pipe is vibrated at a resonant frequency in the audible range and the variation of vibrations at the outer surface of the pipe in the immediate vicinity of flaws is detected and recorded.

Another object of the present invention is to provide a method and an apparatus for determining wall thickness of a pipe by imparting a resonant vibration to the pipe and detecting local variations of intensity of the nodes of such imparted vibrations which are proportional to the wall thickness of the pipe.

Still a further object of the present invention is to provide a method and an apparatus for detecting localized vibrations in a pipe being vibrated at a resonant frequency whereby the presence of flaws and the wall thickness may be determined.

These and other objects of the present invention are hereinafter set forth and explained in relation to the accompanying drawings wherein:

FIGURE 1 is a schematic elevation view of the apparatus of the present invention testing a length of pipe;

FIGURE 2 is a cross-sectional view taken along lines 2—2 in FIGURE 1;

FIGURE 3 is a cross-sectional view taken along lines 3—3 in FIGURE 2;

FIGURE 4 is an elevation view of the carriage of the present invention;

FIGURE 7 is a view taken along lines 6—6 in FIGURE 5 and illustrates the preferred configuration of pick-up coils for the electric hysteresis method of the present invention.

Figure 5:
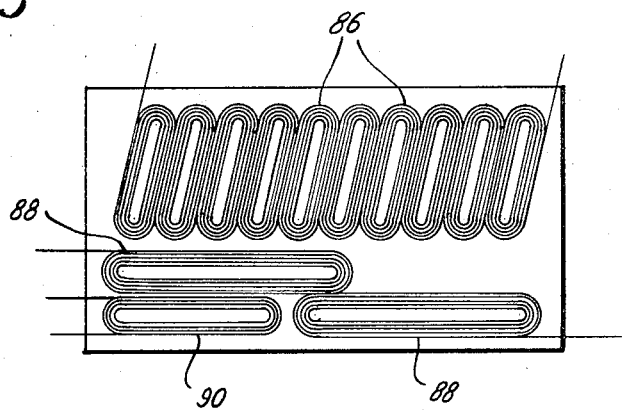
FIGURE 5 is a view taken along lines 4—4 in FIGURE 2 and illustrates the preferred configuration of pick-up coils for the sonic method of the present invention.
Figure 6:
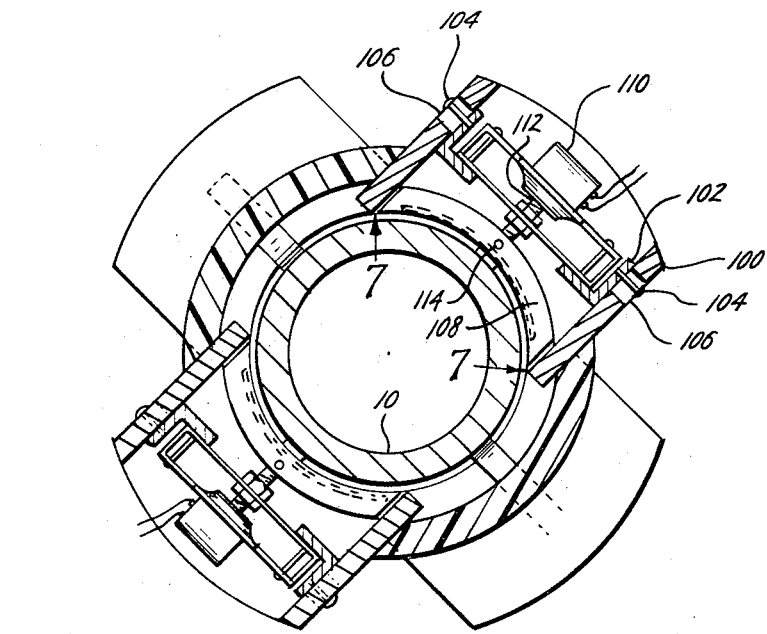
FIGURE 6 is a sectional view similar to FIGURE 2 of the apparatus of the present invention when using the electric hysteresis method of testing.

The present invention is directed to a method and an apparatus for testing a member to determine physical condition of the member. With the present invention, three separate and distinct methods of testing are available with a single apparatus and any individual method of testing and any combination of such methods of testing may be used at one time.

For the purpose of clarity these three methods of testing are designated the sonic method, the magnetic method and the hysteresis method.

The sonic method may be described as imparting a resonant frequency vibration to the member being tested and detecting the imparted vibrations near the surface of the member to determine certain physical conditions of the member. It has been found that with a given intensity of imparted vibrations the variations in local vibrations along a member will be proportional to the elastic properties of the member and, therefore, to the wall thickness of the member being tested, and further that flaws in the member being tested will cause a variation of the local vibrations whereby detection of such variations will be a detection of such flaws. One application of the sonic method would be the testing of a length of drill pipe. In such application the length of pipe would be supported and a vibration imparted to the pipe. The frequency of such vibration should be the free vibration of the pipe or some other resonant frequency of the pipe as hereinafter defined. When the pipe is vibrating at a resonant frequency, preferably in the audible range, the localized vibrations of the pipe are detected and recorded to provide a record from which either the wall thickness of the pipe or the location of flaws may be determined. Such vibrations are readily imparted to the pipe by attaching an electric vibrator or transducer to the pipe. The device which is to impart such vibrations to the pipe should be capable of control, both as to frequency and power, so that the optimum vibration with each individual pipe may be achieved.

Local vibrations at the surface of the pipe may be detected by any suitable device, which in effect would be a microphone. In practice, these vibrations are detected by positioning coils near the surface of the pipe which will be set into vibratory motion by the local vibrations. Such coils do not touch the surface of the pipe being tested but are positioned close to the surface. Generally, a plurality of coils will be used in a shoe and several shoes will be used to cover the entire surface of the pipe, as hereinafter more fully explained. A magnetic field is provided around the detecting coils so that the responding vibrations of the coils will provide a movement of the coils in such magnetic field, thereby producing a potential from each coil which will be proportional to the vibrations of the coil. The potential from these coils is connected to an amplifier and to a recorder or indicator which provide a visual record of the local vibrations.

It has been noted that in a length of pipe which is resonantly vibrated that local vibrations will build up in amplitude (intensity) immediately around a flaw in the pipe. By connecting pairs of coils in series-opposed circuit and by blocking or modulating the coil current in the amplifier to eliminate normal pipe vibrations, the recorder will trace a substantially straight line unless local vibrations exceed the normal vibrations of the pipe at the resonant frequency.

As used herein, the term resonance is intended to mean the phenomenon shown by a vibrating system which responds with maximum amplitude under the action of a harmonic force; this occurs when the frequency of the applied force is the same as a natural frequency of the vibrated body. When saying that the member is vibrated to a resonant frequency, it is meant that conditions are so adjusted that the frequency of the forced vibrations is the same or a multiple of the natural frequency of the body upon which they are impressed, and under such conditions the free vibrations reinforce the received vibrations. This effect is commonly known as resonance.

In using the sonic method of the present invention, the vibrations impressed on the member being tested should cause the member to vibrate in a resonant frequency. The reinforcement of the impressed vibrations by the natural vibrations of the member being tested will greatly reduce the power requirements necessary to achieve the intensity of local vibrations which may be easily amplified and recorded. The imparting of nonresonant frequency vibrations to the member being tested by the sonic method is not contemplated since much greater power would be required for the vibrating device and also because it is believed that such vibrations would make it extremely difficult to distinguish the localized variations in the vibrations resulting from flaws. It is further desired that the vibrations imparted to the member being tested be in the audible or sonic range, that is, between approximately 20 to 20,000 cycles per second. Vibrations in this frequency range may be impressed on the member being tested with commercially obtainable vibrators without the difficulties attendant with ultrasonic vibrations, such as difficulty in achieving a proper coupling to the member being tested, special devices for imparting such vibrations, the power requirements being greater and the difficulty of tuning such devices to the proper frequency.

The magnetic method of the present invention involves the creation of a magnetic field extending through the member being tested and moving a detecting apparatus near the surface of the member to detect the variations in the flux density of the magnetic field resulting from flaws, imperfections and other magnetic anomalies of the member being tested. This magnetic method will readily detect defects, such as circumferential flaws, fatigue cracks, pitting and points of stress concentration. Such magnetic testing has been performed by devices of the prior art but has never been used in combination with either of the other two methods as set forth in the present invention. As used in the present invention, the magnetic method may be accomplished with substantially the same equipment used in the sonic method with the exception that it will not require vibrations to be impressed upon the member being tested, and it will usually require a different amplifier in the detection circuit of the device, that is, an amplifier having a lower frequency rating than the amplifier that is used for the sonic method.

In the form of the sonic method as illustrated in the figures, wherein the pick-up coils are surrounded by an electromagnet, the pick-up of vibrations will be reinforced by the increase in flux density at the flaws and even though a high-frequency amplifier is used in the detection circuit, this reinforcement of the vibration detection will be in a frequency range of the vibrations and will also be amplified. The low-frequency voltage which will be generated in this type sonic detector will not be amplified in the detection circuit and therefore will not create any confusion of the recording.

The third method utilized in the present invention has been designated the hysteresis method. This method involves the creation of a fluctuation magnetic field in an area immediately adjacent the surface of the member being tested and detecting in the phase relationship any distortion, eddy currents, resulting from surface cracks or flaws. This hysteresis method will be applicable to non-ferrous metallic materials and to ferrous materials. The hysteresis method has particular application to members to be tested which have an irregular or flat surface. This method is particularly applicable to testing where very fine fatigue cracks are present in the outer surface, such as mill flaws, and which might be covered by mill scale. Such mill scale would distort the detection of the flaw in the magnetic method. The detection is accomplished by coils which generate a potential by vibration in the variable magnetic flux resulting from the eddy currents created and thereby detect surface flaws.

The illustrations of the figures show the preferred form of the apparatus of the aforementioned three methods but it should be noted that all three methods may be installed in a single detection carriage and a sufficient number of amplifiers and recorders provided to simultaneously record the detection from all three units. Since the sonic and hysteresis methods will both result in a high-frequency pick up, they are designed in the apparatus illustrated to use the same amplifier circuit and the magnetic method is provided with a low-frequency amplifier which may be switched into the detection circuit when the magnetic method is being used. Further, if desired, a single set of pick-up coils may be used for all three methods, but it is believed that better results will be achieved by the use of a separate pick-up coil unit for the hysteresis method for the reasons hereinafter explained.

In such preferred form, it has been thought best for economy of equipment to individually test the member being tested with each method separately and thereby provide three separate test records. The results of testing using all three of these methods will be complete and provide interrelated corroboration on the presence and location of flows in the member being tested and, in addition, may provide further individual information from each method which is not available from the other two of such methods. It is further desirable to be able to use any one or two of the methods, separately or in combinaiton in the testing of a member without the use of the other methods and such may be accomplished with the preferred apparatus illustrated. A simple conversion is available to convert the testing apparatus from any one method to any other method.

Referring more in detail to the drawings, FIGURE 1 illustrates the apparatus of the present invention testing the pipe 10. Pipe 10 is supported at points near its ends by the supports 12 and 14. Vibrating device 16 is secured to one end of the pipe 10 as by a flexible strap or other suitable means. Vibrating device 16 may be of any suitable type which will impart a vibration to the pipe 10 having a frequency in the audible range. An example of such device would be a typical speaker assembly with a speaker cone removed and the end of the core engaging the pipe surface. Such device would then respond to the frequency of the current supplied thereto. Such device can be tuned to any desired frequency in the audible range and have a variable power input. A carriage 18 is shown mounted around the pipe 10. This is possible by constructing the carriage in two semicircular portions and providing hinge means (not shown) on one side and the latch means 20 on the opposite side. Wheels 22 are mounted in the carriage 18 and engage the outer surface of the pipe 10 for easy, smooth movement of the carriage 18 along the length of the pipe 10. Electromagnet 24 surrounds carriage 18 and extends longitudinally thereof a substantial portion of the length of carriage 18. Power supply 26 is connected through the switch 28 and adjustable rheostat 30 to provide electromagnet 24 with power. Control and recording box 32 is provided with power supply 34. Connection is provided between vibrating device 16 and box 32 and also between carriage 18 and box 32. Pulley 36, having a cable 38 wound therearound and extending therefrom to connect to carriage 18, is suitably supported and provided with means (not shown) for rotation whereby cable 38 will be wound thereon causing carriage 18 to be pulled longitudinally along pipe 10.

Control and recording box 32 is provided with recorder 40 having a plurality of recording pens, amplifiers 42 and suitable switches and indicating instruments as hereinafter described. As shown, recorder 40 is the usual strip-chart recorder having multiple recording channels. A suitable control and indicating device should be provided to control the frequency and power supplied to vibrating device 16 and to detect resonation of the pipe 10. Also, suitable switching devices should be provided in box 32 to allow ready switching from high-frequency to low-frequency amplifiers.

Referring to the details, as illustrated in FIGURES 2, 3 and 4, the device illustrated therein is the apparatus used for practicing the sonic method of the present invention. It should be noted that in all views of the drawings the common parts will have the same numeral. As shown in FIGURES 2, 3 and 4, the carriage 18 is positioned around the pipe 10 with the carriage wheels 22 engaging pipe 10. Carriage 18, as previously mentioned, is divided into semicylindrical sections. Each section of carriage 18 is offset as at 44 and 46 whereby one of each pair of opposing recesses 48 and 50 is contained in each section of carriage 18. As shown in FIGURE 2, each of the recesses 48 and 50 extend through the carriage 18 at a 45° angle in relation to the vertical and are sufficiently large to receive one of the coil shoe boxes 52. An angle 54 is secured to each end of the coil shoe boxes 52. With respect to ends of coil shoe boxes 52, it is meant those portions facing in the directions of the longitudinal axis of the pipe being tested. A pair of threaded pins 56, which are suitably secured in carriage 18, extend outwardly therefrom in parallel relation to the recesses 48 and through the extending lip of angle 54. A nut 58 is threaded onto the threaded pins 56. The nut 58 is engaged by the underside of the angle 54 whereby the position of the individual coil shoe box 52 in the recesses 48 or 50 may be varied. Coil spring 60 surrounds threaded pin 56 with one end engaging the outwardly extending leg of angle 54 and the other end being held by the nut 62. By mounting coil shoe boxes 52 in this manner, they are held in position with respect to carriage 18, but such mounting provides a resiliency by virtue of the use of the coil spring 60 which will dampen any shocks.

One pick-up coil shoe 64 is positioned within each of the coil shoe boxes 52. Each of the pick-up coil shoes 64 is provided with pick-up coils having the arrangement illustrated in FIGURE 5, as hereinafter more fully explained. Each coil shoe 64 is provided with a centrally positioned threaded rod 66 which is firmly affixed to the shoe by any suitable means, such as threading, and which extends upwardly therefrom to and through the support beam 68. The nuts 70, one positioned on each side of the beam 68, secure rod 66 to beam 68 and thus beam 68 supports the shoe 64 within the box 52.

Support beam 68 extends longitudinally through the slot 72 in the ends of boxes 52 and is provided with pin ends engaging into anchor members 74. The engagement between the ends of support beam 68 and anchor member 74 is rotational and provided with set screws 76 whereby the angular position of beam 68 may be adjusted and set. Resilient mounting washer 78 is secured to carriage 18 by the threaded pin 80 and to anchor member 74 by threaded pin 82 and the nut 84. As used herein, the term "beam length" shall be intended to mean the length between the center line of the pins 82 at each end of the support beam 68.

It is preferred that this beam length be approximately one-fourth the length of the sound wave impressed on the pipe 10. The purpose of this extended length for supporting coil shoe 64 is to cause the coil shoe 64 to vibrate with the average intensity of the imparted vibrations and thereby avoid the extreme low and high intensities of the nodes and nulls. Further, the resilient mounting washer 78 will act to provide an insulation in the support of coil shoe 64 whereby the miscellaneous noise or vibrations due to the movement of the carriage 18 along the pipe 10 with the wheels 22 engaged therewith will be dampened to an extent whereby such noise will not interfere with the pick-up of the localized vibrations responsive to flaws or variations in wall thickness.

Referring to FIGURE 5, a layout of the coils, contained in pick-up coil shoe 64, is illustrated. The angularly positioned coils 86 are all interconnected in a series-opposed connection and are angularly placed with respect to the longitudinal axis of the member to be tested at an angle of approximately 13 degrees. Transverse coils 88 are positioned at right angles to the axis of the member to be inspected. Additionally, coil 90 is positioned substantially perpendicular to the longitudinal axis of the member to be tested. With coils 86 interconnected in a series-opposed circuit, two leads extend from these coils and these two leads connect to the socket connection 92 in the wall of coil shoe box 52. Transverse coils 88 are also connected in series-opposed connection and the two leads therefrom also connect into the socket connection 92. The two leads from the coil 90 connect into socket connection 92. With the device as shown, a suitable multiple lead is provided by which the six leads from the coils in coil shoe 64 are combined and connect into the control and recording box 32.

Electromagnet 24 is supported by a pair of arcuate members 94 which are secured to the supports 96 extending radially outward from and secured to the carriage 18, as shown in FIGURE 4. The supports 96 are secured to the carriage 18 as by threading and arcuate members 94 are secured to the supports 96 by the screws 98.

The carriage 18, the pick-up coil shoe 64 and the wheels 22 are made from a phenolic board with the remainder of the components being in a suitable material, such as non-ferrous metals. It is only necessary to avoid ferrous and other metals which would have the effect of modifying the magnetic fields used in the present invention. Therefore, any materials may be used for the structures provided such materials do not interfere with the methods utilized.

The inner surface of shoe 64 has an arcuate shape and has the coils 86, 88 and 90 firmly bonded thereon in the position illustrated in FIGURE 5 and is provided with a suitable insulating cover over such coils which will prevent direct contact between the coils and the surface of the pipe being inspected. As stated pick-up coil shoe 64 is made of a phenolic board but may be made of any other suitable material such as Plexiglas which will have sufficient flexibility to allow adjacent coils to respond to variations in intensity of local vibrations at the surface of the pipe. Excessive flexibility should be avoided as it will complicate the problem of resolving the variations in vibrations which results directly from flaws or other physical conditions which may be detected by such variations from other vibrations. The inner surface of the shoe 64 is curved to a slightly larger radius than the radius of the pipe 10. With the shoe having this configuration and properly positioned, it will act as a reflector for the vibrations of the pipe and thereby cause the coils to vibrate responsive to the local vibrations at the surface of the pipe. It is desired that the inner surface of coil shoe 64 be positioned in close spaced relationship to the exterior of the pipe 10. The space between the inner surface of coil shoe 64 and the exterior of the pipe 10 preferably is not less than one-thirty-second of an inch and not more than one-sixteenth of an inch. A closer positioning of coil shoe 64 with respect to the exterior of pipe 10 might cause direct contact during operations and such direct contact would not provide a proper indication of the variations in vibrations. Spacing which would be much greater than the preferred spacing would interfere with the vibrations of the individual coils with respect to each other and therefore may tend to obscure the localized vibrations which are to be detected. It is preferred that the spacing between the inner surface of coil shoe 64 and the exterior of pipe 10 should be set between forty and forty-five-thousandths of an inch.

It has been found that a pair of coils wound of approximately 200 turns of No. 47 copper wire, having a total induction of approximately 180 millihenries in a direct current resistance of approximately 200 ohms, is suitable for use as one of the individual pick-up coils.

The size of the coils 86 are believed to be critical in their relationship to the wave length of the imparted vibrations. For all normal operations in the frequencies contemplated by the present invention it has been determined that the outside length of each of the coils 86 should not exceed six-tenths of an inch, the individual coil sides should be approximately one-twentieth of an inch and the width of the central space not more than one-twentieth of an inch, thereby providing a coil which is not more than six-tenths of an inch long by three-twentieths of an inch wide. Each coil has a general hairpin shape with both ends closed, or to describe the coil shape another way, it is elongated with relatively parallel sides and rounded ends.

In the sonic method of the apparatus just described, the coils 86 and 88 are hooked up in series-opposed circuit. Their output is amplified in the amplifiers 42 within box 32 and the output of such amplifiers is conducted to the recorder 40. The 13-degree angular positioning of the coils 86 is not essential but it is suggested as a preferential arrangement. When used with the sonic method, the configuration of the coils 86 with the coils 88 will allow flaws extending in any direction in the member being tested to be detected. For example, the coils 86 in themselves would not detect a transverse flaw, which would be perpendicular to the line of travel of the carriage 18, since each of the coils would receive the greater intensity of vibrations and generate a larger output responsive to the flaw at the same time, and the series-opposed connection of the coils would cause greater output of each of the coils to cancel. The coil 90, as previously stated, is optional and is used to detect the point of resonation to assist in the tuning of the vibrating device 16 to the proper frequency whereby resonation of the pipe 10 is assured.

The electromagnet 24 may be, for example, a 12-volt D.C. electromagnet having a coil winding of 500 turns of No. 12 wire and drawing approximately 10 amps of current.

The connections into control box 32 from power supply 34, from vibrating device 16 and from the carriage 18 are all suitable multi-prong plugs. It should be noted that all electrical connections to the carriage 18 and to the electromagnet 24 should have sufficient flexibility and length to allow complete freedom of movement of the carriage 18 with the magnet 24 thereon along the total length of the pipe 10.

The control box 32 should be provided with a switch 120 to convert the apparatus previously described from the sonic method to the magnetic method of detection. This switch 120 should direct the output from the coils 88 to the low-frequency amplifiers in the box 32 and also may, if desired, provide a shut-off for the output to the vibrating device 16.

In the apparatus used for the hysteresis method of the present invention, the carriage 18 is provided with four coil shoe boxes 100 which may be substantially the same as coil shoe boxes 52 with provision for the ready insertion and removal of the support angles 102 on the interior thereof, as shown. Support angles 102 are secured on the interior of boxes 100 by the screws 104 extending through the slot 106 in the sides of the boxes 100. As shown, the slots provide for a height adjustment in the positioning of the angles 102 closer or farther from the pipe 10 so that the coil shoe 108 may be positioned in close space relationship to the outer surface of the pipe 10. The device 110, provided with suitable supporting structure to be fixedly mounted to the angles 102 within boxes 100, is a vibrating-type device which will provide a pulsating, magnetic field and which will also drive the core 112 extending therefrom. Core 112 is connected to coil shoe 108. Locking screw 114 is provided extending through coil shoe 108 to lock the core 112 in threaded engagement within the coil shoe 108.

As shown in FIGURE 7, a plurality of transverse coils 116 and angularly positioned coils 118, all connected in a series-opposed circuit, are provided in coil shoe 108. Since all coils are interconnected in a single series-opposed circuit, two leads extend from the coils.

With alternating currents applied to the leads connecting to the device 110, a fluctuating magnetic field will be set up in the surface of the pipe 10 and also coil shoe 108 will be rapidly vibrated by the device 110. The fluctuating magnetic field will extend into the surface of the pipe 10 and eddy currents will be created immediately around any surface flaw. The vibrational movement of shoe 108 and the longitudinal movement of carriage 18 will cause the coils 116 and 118 to be moved in the magnetic field. This movement will generate a potential that is responsive to the build up in eddy current, thereby allowing detection of surface flaws.

If desired, the apparatus previously described for the sonic and magnetic apparatus may also be used for the hysteresis method of detecting flaws by impressing an alternating current on the electromagnet 24 and allowing the coils, through movement of the carriage 18, to pass through the eddy currents at the flaws.

It should be noted that with the hysteresis method when using a high frequency of the fluctuating magnetic field, a high-frequency amplifier should be used. The amplifier used for the sonic method of the present invention has been found to be suitable and may be used in the hysteresis method of the present invention with a high-frequency fluctuating field.

The method and apparatus of the present invention therefore provide a novel combination of three separate and distinct methods of testing a member to determine the physical condition of the member, which three methods may be used at the same time or in any combination as desired. The method and apparatus for the sonic testing of the present invention involve a completely novel approach to testing by imparting a resonant vibration to the member being tested and detecting the local vibrations of the member to determine the physical condition of the member being tested. In this sonic method, the impressed vibrations are reinforced by the natural vibrations of the member being tested. By directly mounting the coils for the hysteresis method of the present invention on the core of the mechanism creating the fluctuating magnetic field, a larger potential is created by the eddy currents than when the coils are not vibrated thereby greatly improving the results achievable with any prior method or apparatus utilizing a hysteresis method of testing. Any one of the three methods may be used by merely moving switch 120 on control box 32. Position 1 of switch 120 will connect the apparatus to use the sonic method; i.e., will energize vibrating device 16 and electromagnet 24 and will also connect coils 86 and 88 through high-frequency amplifiers to recorder 40. Position 2 of switch 120 will connect the apparatus to use the magnetic method; i.e., will energize electromagnet 24 and will connect coils 88 through low-frequency amplifiers to recorder 40. Position 3 of switch 120 will connect the apparatus to use the hysteresis method; i.e., will energize the device 110 and will connect the coils 116 and 118 through high-frequency amplifiers to recorder 40. It is generally preferred, as has been stated before herein, that separate detection equipment be used for the hysteresis method but this may be accomplished by lengthening the carriage or by taking the time to change out the coil shoes between runs of the different methods.

When running the sonic method of the present invention, the pipe is first vibrated by vibrating device 16 to a frequency which is a resonant frequency of the pipe 10 and then the carriage 18 is moved along the length of pipe 10 to scan for any defects. It will generally be preferred to have an indicator of the output potential from the pick-up coils to provide a general indication of the location of any flows and then to manually move the carriage 18 across such locations with the recorder 40 switched on to provide a permanent record of the detection of any flaw. When the sonic method is being run to determine wall thickness, it may be operated in a similar manner, that is, by providing a general indication of the variations of the wall thickness from the standard wall thickness and then running a recording of those areas which appear to have a wall thickness varying from such standard wall thickness. If desired a continuous recording may be made on recorder 40 of all testing.

All methods of the present invention are accomplished in generally the same manner. The carriage 18 is moved along the length of the pipe 10, either manually or by use of pulley 36 and cable 38. Switching from one method to another may be accomplished readily by control box 32; it being understood that such switching will connect the proper amplifier into the detection circuit and will also actuate the proper power source for the method, the power to the vibrating device 16 and the electromagnet 24 for the sonic method, the electromagnet 24 for the magnetic method and the device 110 providing the fluctuating magnetic field for the hysteresis method. This switching should further connect the particular pick-up device of the method being used through the proper circuit and to an indicating device or recording device as desired.

The present invention therefore provides a method and an apparatus for testing a member utilizing any one or more of three different testing methods, provides a completely novel sonic testing method and apparatus and further provides an improved hysteresis method and apparatus for testing. By using the method and apparatus of the present invention a member such as a pipe may be completely tested to determine its physical condition; i.e., tested to determine its wall thickness, the presence of flaws, pitting, erosion, corrosion, fatigue cracks, mill flaws, and the presence of stress concentrations. The method and apparatus of the present invention therefore, affords a complete package for the testing of a member to determine its physical condition. The apparatus of the present invention is relatively simple, compact, requires limited power as compared to many devices of the prior art, and provides accurate test results of the many variations in the physical condition of a member being tested so that the usefulness of the tested member may be determined.

What is claimed is:

1. The method of detecting flaws in a pipe comprising, supporting the pipe at two spaced-apart points near each end of said pipe,
imparting resonant frequency vibrations to said pipe wherein the frequency of said imparted vibrations is within the audible range,
scanning the surface of said pipe with a vibration detecting device whereby the intensities of local vibrations are detected,
blocking out all of the detected intensities of local vibrations except the variations in such intensities, and
indicating such variations in intensity whereby flaws in said pipe are detected.

2. The method of detecting flaws in a pipe comprising, imparting resonant frequency vibrations in the audible range to the pipe being tested,
detecting the intensity of local vibrations over the pipe,
blocking out the average intensity of said detected local vibrations whereby only variations from the average intensity of vibrations remain, and
indicating such variations from the average intensity of vibrations whereby flaws in said pipe are indicated.

3. The method of detecting flaws in a pipe comprising, imparting resonant frequency vibrations to the pipe being tested,
moving a plurality of pick-up coils over the surface of said pipe,
establishing a magnetic field around said pick-up coils and said pipe whereby said pick-up coils when vibrating responsive to the local vibrations will cut the lines of force of said magnetic field and generate a potential,
connecting the potential generated in adjacent pick-up coils in opposed circuit whereby the potential generated by a pair of coils will be representative of the variations in intensity of vibrations detected by each coil, and
indicating said resulting potential generated whereby flaws in said pipe are detected.

4. An apparatus for testing a member comprising, a vibrating device connected to the member being tested whereby said vibrating device imparts vibrations to said member,
means controlling the frequency of said vibrations imparted to said member by said vibrating device whereby said member is vibrated at a resonant frequency,
at least one pair of detecting coils connected in series opposed circuit to each other and adapted to be moved in close spaced relationship over the surface of said member, and
an electromagnet creating a magnetic field in which said coils vibrate responsive to the local vibrations of said member whereby said coils cut the flux lines of said magnetic field and generate an electric potential which is proportional to variations in intensity of said local vibrations of said member.

5. An apparatus for testing a member comprising, a vibrating device connected to the member being tested whereby said vibrating device imparts vibrations to said member,
means controlling the frequency of said vibrations imparted to said member by said vibrating device whereby said member is vibrated at a resonant frequency,
at least one pair of detecting coils connected in series opposed circuit to each other and adapted to be moved in close spaced relationship over the surface of said member, and
an electromagnet creating a magnetic field in which said coils vibrate responsive to the local vibrations of said member whereby said coils cut the lines of force of said magnetic field and generate an electric potential which is proportional to variations in intensity of said local vibrations of said member and to the variations of the flux density of said magnetic field.

6. An apparatus for testing a member comprising, a vibrator connected to the member being tested whereby said vibrator imparts vibrations to said member,
means controlling the frequency of said vibrations imparted to said member by said vibrator whereby said member is vibrated at a resonant frequency,
at least one pair of longitudinal detecting coils adapted to be moved in close spaced relationship over the surface of said member and positioned at an angle of approximately 13 degrees with respect to the longitudinal axis of said member,
at least one pair of transverse detecting coils adapted to be moved in close spaced relationship over the surface of said member and positioned at an angle of approximately 90 degrees with respect to the longitudinal axis of said member, and
an electromagnet creating a magnetic field in which said coils vibrate responsive to local vibrations of said member whereby said coils cut the lines of force of said magnetic field and generate a potential,
all of said coils being connected in series-opposed circuit whereby the potential generated by said coils is proportional to the variations in intensity of said local vibrations of said member.

7. An apparatus for testing a member according to claim 6 wherein,
said longitudinal detecting coils are elongated in shape and closed at each end and the outside length of said coils does not exceed six-tenths of an inch.

8. An apparatus for testing a member according to claim 7 wherein,
each leg of said longitudinal coils is approximately one-twentieth of an inch wide and said legs are spaced apart approximately one-twentieth of an inch.

9. An apparatus for testing a member according to claim 6 wherein,
each of said longitudinal and said transverse coils being a multiple flat elongated winding of the coil wire having parallel, spaced apart legs and closed ends.

10. An apparatus for testing a member comprising, a vibrator connected to the member being tested whereby said vibrator imparts vibrations to said member,
means controlling the frequency of said vibrations imparted to said member by said vibrator whereby said member is vibrated at a resonant frequency,
a carriage adapted to surround and be movable along said member,
a plurality of pick-up coils supported by said carriage and positioned in close spaced relationship to the surface of said member,
an electromagnetic coil,
means on said carriage supporting and positioning said electromagnetic coil in surrounding relationship to said carriage and said member whereby said coil creates a magnetic field around and through said member in which said pick-up coils vibrate responsive to local vibrations of said member,
said pick-up coils connected in series opposed circuit to each other whereby vibrations of said pick-up coils in said magnetic field will cause said coils to cut the lines of force of said magnetic field and generate a potential proportional to the variations in intensity of said local vibrations of said member.

11. An apparatus according to claim 10 wherein, said pick-up coils are supported from two points on said carriage and said two points are spaced apart by approximately one-fourth the wave length of the vibrations imparted to said member.

(References on following page)

References Cited

UNITED STATES PATENTS

| | | | |
|---|---|---|---|
| 445,860 | 2/1891 | De Place | 73—69 |
| 1,414,077 | 4/1922 | Fessenden | 73—67.2 |
| 2,782,632 | 2/1957 | Klein et al. | 73—67.2 |
| 2,903,886 | 9/1959 | Renaut | 73—67.2 |
| 3,039,296 | 6/1962 | Destuynder et al. | 73—67.2 |
| 3,226,975 | 1/1966 | Muller et al. | 73—67.2 |
| 3,237,446 | 3/1966 | Wood | 73—67.9 |

OTHER REFERENCES

Article entitled, "Vibration Measurement in Gas Turbine Blader," by D. A. Morley, from Instruments and Control Systems, pages 254–257, vol. 33, February 1960.

An article by L. R. Koval entitled, "Vibration Analysis of Thin-Walled Cylindrical Shells" from the "Vibration Notebook," January 1962, pages 1–3.

JAMES J. GILL, *Primary Examiner.*